US010782901B2

(12) United States Patent
Wu

(10) Patent No.: US 10,782,901 B2
(45) Date of Patent: Sep. 22, 2020

(54) METHOD FOR PERFORMING INITIALIZATION IN A MEMORY DEVICE, ASSOCIATED MEMORY DEVICE AND CONTROLLER THEREOF, AND ASSOCIATED ELECTRONIC DEVICE

(71) Applicant: Silicon Motion Inc., Hsinchu County (TW)

(72) Inventor: Po-Wei Wu, Keelung (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 16/352,829

(22) Filed: Mar. 14, 2019

(65) Prior Publication Data
US 2019/0294354 A1    Sep. 26, 2019

(30) Foreign Application Priority Data

Mar. 20, 2018   (TW) .............................. 107109506 A

(51) Int. Cl.
*G06F 3/06*     (2006.01)
*G06F 9/445*    (2018.01)
*G06F 9/4401*   (2018.01)
*G06F 9/44*     (2018.01)

(52) U.S. Cl.
CPC .......... *G06F 3/0632* (2013.01); *G06F 3/0604* (2013.01); *G06F 3/064* (2013.01); *G06F 3/0659* (2013.01); *G06F 3/0679* (2013.01); *G06F 9/4401* (2013.01); *G06F 9/44505* (2013.01)

(58) Field of Classification Search
CPC ..................................... G06F 3/06; G06F 9/44

USPC ......................................................... 711/103
See application file for complete search history.

(56) References Cited

U.S. PATENT DOCUMENTS

| 6,467,016 B1* | 10/2002 | Kanai ...................... G11C 7/16 711/103 |
| 2010/0202239 A1* | 8/2010 | Moshayedi .............. G11C 5/04 365/229 |
| 2011/0022826 A1* | 1/2011 | More ........................ G06F 1/26 713/1 |

(Continued)

FOREIGN PATENT DOCUMENTS

| TW | 200947213 A1 | 11/2009 |
| TW | 201333959 A1 | 8/2013 |

(Continued)

*Primary Examiner* — Christopher B Shin
(74) *Attorney, Agent, or Firm* — Winston Hsu

(57) ABSTRACT

A method for performing initialization in a memory device, the associated memory device and the controller thereof, and an associated electronic device are provided. The method may include: after a non-volatile (NV) memory within the memory device is powered on, searching for an empty-memory indicator in the NV memory, wherein the empty-memory indicator is applicable to determining whether the NV memory is empty; and according to whether the empty-memory indicator is found or not, selectively skipping or performing a program code search in the NV memory, to complete an initialization process, wherein the initialization process includes at least one initial setting of the memory device, and if the empty-memory indicator is found, the program code search is skipped, otherwise, the program code search is performed.

20 Claims, 6 Drawing Sheets

(56) References Cited

U.S. PATENT DOCUMENTS

| | | | | |
|---|---|---|---|---|
| 2012/0247420 | A1* | 10/2012 | Griffiths | F16B 5/025 |
| | | | | 123/198 E |
| 2014/0350876 | A1* | 11/2014 | Brochhaus | G01R 31/367 |
| | | | | 702/63 |
| 2016/0246672 | A1* | 8/2016 | Yang | G06F 11/1068 |
| 2016/0321002 | A1* | 11/2016 | Jung | G06F 3/0632 |
| 2017/0052589 | A1* | 2/2017 | Raffa | G06F 3/014 |
| 2017/0125104 | A1* | 5/2017 | Baran | G11C 16/08 |
| 2017/0277589 | A1* | 9/2017 | Tai | G06F 11/1068 |
| 2019/0155517 | A1* | 5/2019 | Chinnamaharajan | |
| | | | | G06F 3/0653 |
| 2019/0205247 | A1* | 7/2019 | Lin | G06F 3/0679 |

FOREIGN PATENT DOCUMENTS

| | | |
|---|---|---|
| TW | 201510723 A | 3/2015 |
| TW | 201525691 A | 7/2015 |
| TW | 201527974 A | 7/2015 |
| TW | 201611035 A | 3/2016 |
| TW | 201614671 A | 4/2016 |
| TW | 201618114 A | 5/2016 |
| TW | 201714088 A | 4/2017 |
| TW | 201810088 A | 3/2018 |

\* cited by examiner

METHOD FOR PERFORMING INITIALIZATION IN A MEMORY DEVICE, ASSOCIATED MEMORY DEVICE AND CONTROLLER THEREOF, AND ASSOCIATED ELECTRONIC DEVICE

BACKGROUND OF THE INVENTION

1. Field of the Invention

The present invention relates to the access of flash memories, and more particularly, to a method for performing initialization in a memory device, the associated memory device and controller thereof, and an associated electronic device.

2. Description of the Prior Art

Developments in memory technology have enabled the wide application of various portable and non-portable memory devices (e.g. memory cards conforming to the SD/MMC, CF, MS, XD or UFS specifications, solid state drives (SSDs), embedded storage devices conforming to the UFS or EMMC specifications, etc.). Improving access control of memories in these memory devices remains an issue to be solved in the art.

NAND flash memories may comprise single level cell (SLC) and multiple level cell (MLC) flash memories. In an SLC flash memory, each transistor used as a memory cell may have either of two electrical charge values respectively corresponding to logical values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, in a situation where the flash memories are manufactured by newer techniques, the booting time of a high capacity memory device may be very long. More particularly, for a memory device having downgraded flash dies installed therein, various problems may occur, for example, the problems such as longer initialization time, initialization failures, and so on. Hence, there is a need for a novel method and associated architecture to improve the performance of the memory device without introducing aside effector in a way that is less likely to introduce a side effect.

SUMMARY OF THE INVENTION

An objective of the present invention is to provide a method for performing initialization (e.g. an initialization process) in a memory device, the associated memory device and control thereof, and an associated electronic device, in order to solve the aforementioned problems.

An objective of the present invention is to provide a method for performing initialization (e.g. an initialization process) in a memory device, the associated memory device and control thereof, and an associated electronic device, in order to reach the optimal performance of the memory device without introducing a side effect or in a way that is less likely to introduce a side effect.

At least one embodiment of the present invention provides a method for performing initialization in a memory device. The memory device comprises a non-volatile (NV) memory which comprises one or more NV memory elements. The one or more NV memory elements comprise a plurality of blocks. The method may comprise: after the NV memory is powered on, searching for an empty-memory indicator in the NV memory, wherein the empty-memory indicator is applicable to determining whether the NV memory is empty; and according to whether the empty-memory indicator is found or not, selectively skipping or performing a program code search in the NV memory, to complete an initialization process, wherein the initialization process comprises at least one initial setting of the memory device, and if the empty-memory indicator is found, the program code search is skipped, otherwise, the program code search is performed.

At least one embodiment of the present invention provides a memory device which comprises an NV memory and a controller. The NV memory is arranged to store information, wherein the NV memory comprises one or more NV memory elements, and the one or more NV memory elements comprise a plurality of blocks. The controller is coupled to the NV memory, and is arranged to control operations of the memory device, wherein the controller comprises a processing circuit. The processing circuit is arranged to control the controller according to a plurality of host commands from a host device, to allow the host device to access the NV memory via the controller. For example, after the NV memory is powered on, the controller searches for an empty-memory indicator in the NV memory, wherein the empty-memory indicator is applicable to determining whether the NV memory is empty. According to whether the empty-memory indicator is found or not, the controller selectively skips or performs a program code search in the NV memory, to complete an initialization process, wherein the initialization process comprises at least one initial setting of the memory device; and if the empty-memory indicator is found, the program code search is skipped, otherwise, the program code search is performed.

According to some embodiments, the present invention further provides an electronic device which comprises the aforementioned memory device, and further comprises the host device coupled to the memory device. The host device may comprise: at least one processor arranged to control operations of the host device; and a power supply circuit that is coupled to the aforementioned at least one processor, and is arranged to provide power to the aforementioned at least one processor and the memory device. The memory device is arranged to provide storage space for the host device.

At least one embodiment of the present invention provides a controller of a memory device, wherein the memory device comprises the controller and an NV memory, the NV memory comprises one or more NV memory elements, and the one or more NV memory elements comprise a plurality of blocks. The controller comprises a processing circuit which is arranged to control the controller according to a plurality of host commands from a host device, to allow the host device to access the NV memory via the controller. For example, after the NV memory is powered on, the controller searches for an empty-memory indicator in the NV memory, wherein the empty-memory indicator is applicable to determining whether the NV memory is empty. According to whether the empty-memory indicator is found or not, the controller selectively skips or performs a program code search in the NV memory, to complete an initialization process, wherein the initialization process comprises at least one initial setting of the memory device, and if the empty-memory indicator is found, the program code search is skipped, otherwise, the program code search is performed.

An advantage of the present invention is that the method and associated apparatus can perform proper control for operations of the controller, in order to reach the optimal performance of the memory device. More particularly, when flash memory manufacturers adopts newer techniques to manufacture memory devices equipped with ultra-large storage space, the method and associated apparatus of the present invention can fully utilize various grades of flash dies provided by the flash memory manufacturers. Further, implementing embodiments of the present invention will not cause a lot of additional costs. Therefore, the problems in the related art can be solved without significantly increasing the overall cost. In comparison with the related art, the present invention can reach the optimal performance of the memory device without introducing a side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

I. Memory System

Figure 1:
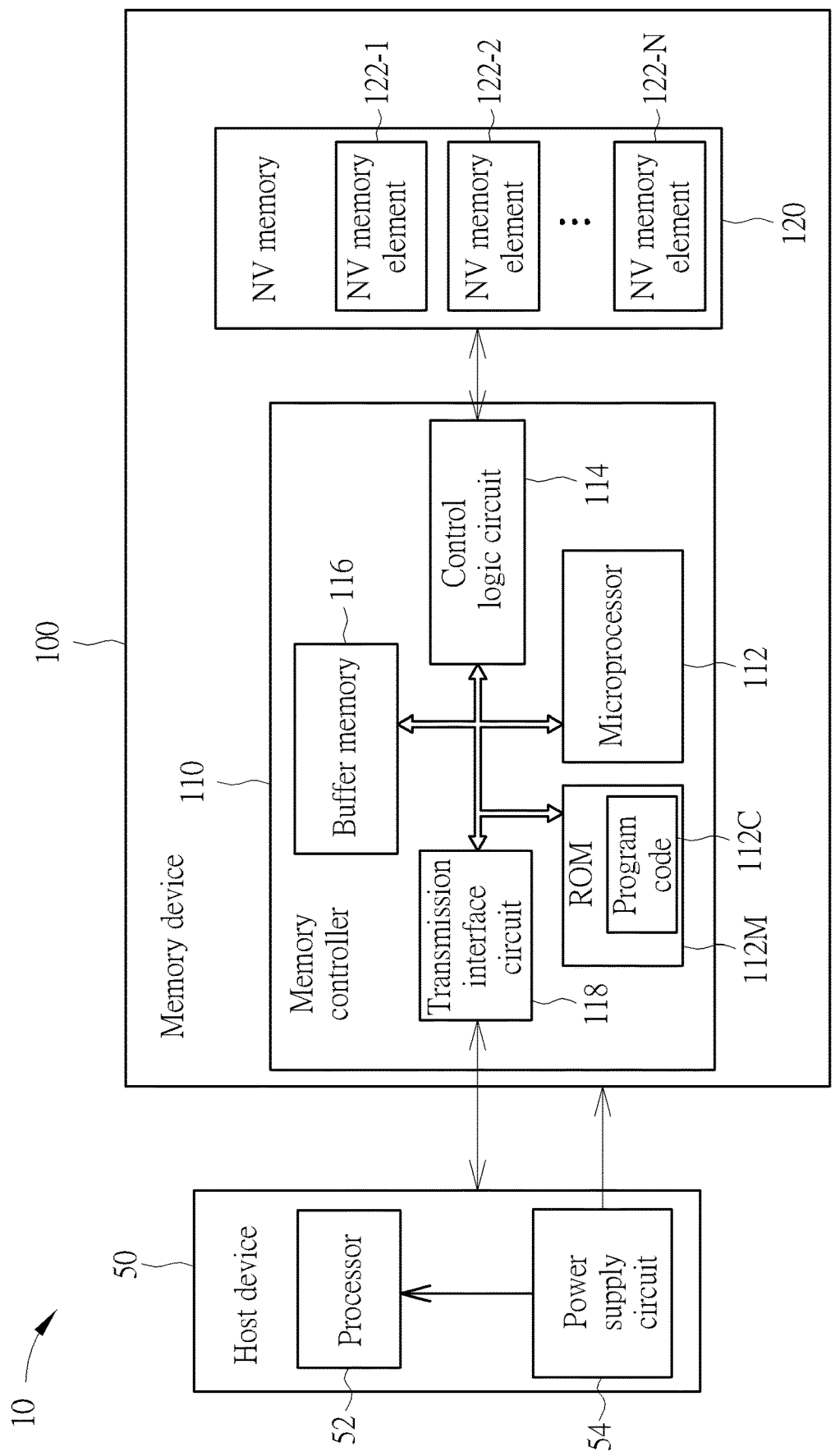
FIG. 1 is diagram illustrating an electronic device according to an embodiment of the present invention.

FIG. 1 is diagram illustrating an electronic device 10 according to an embodiment of the present invention, where the electronic device 10 comprises a host device 50 and a memory device 100. The host device 50 may comprise: at least one processor 52 (e.g. one or more processors) arranged to control operations of the host device 50; and a power supply circuit 54 that is coupled to the aforementioned at least one processor 52, and is arranged to provide power to the aforementioned at least one processor 52 and the memory device 100, and output one or more driving voltages to the memory device 100, where the memory device 100 may provide storage space to the host device 50, and may obtain the one or more driving voltages from the host device 50 as the power of the memory device 100. Examples of the host device 50 may include, but are not limited to: multifunctional mobile phones, tablets, wearable devices, and personal computers (PCs) such as desktop computers or laptop computers. Examples of the memory device 100 may include, but are not limited to: portable memory devices (such as memory cards conforming to the SD/MMC, CF, MS, XD or UFS specifications), solid state drives (SSDs) and various embedded storage devices (such as those conforming to the UFS or EMMC specifications). According to this embodiment, the memory device 100 may comprise a controller such as a memory controller 110, and may further comprise a non-volatile (NV) memory 120, wherein the controller is arranged to access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where the symbol "N" may represent an integer greater than one. For example, the NV memory 120 may be a flash memory, and the NV memory elements 122-1, 122-2, . . . , and 122-N may be a plurality of flash memory chips (which may be referred to as flash chips, for brevity) or a plurality of flash memory dies (which may be referred to as flash dies, for brevity), respectively, but the present invention is not limited thereto.

As shown in FIG. 1, the memory controller 110 may comprise a processing circuit such as a microprocessor 112, a storage such as a read-only memory (ROM) 112M, a control logic circuit 114, a buffer memory 116 and a transmission interface circuit 118, where at least one portion (e.g. a portion or all) of these components may be coupled to each other via a bus. The buffer memory 116 is implemented with a random access memory (RAM), for example, a Static RAM (SRAM), where the random access memory may provide internal storage space for the memory controller 110, for example, may temporarily store data, but the present invention is not limited thereto. Further, the ROM 112M of this embodiment is arranged to store a program code 112C, and the microprocessor 112 is arranged to execute the program code 112C to control the access of the NV memory 120. Please note that the program code 112C may be stored in the buffer memory 116 or any type of memories. In addition, the control logic circuit 114 may be arranged to control the NV memory 120. The control logic circuit 114 may comprise an error correction code (ECC) circuit (not shown), to protect data and/or perform error correction. The transmission interface circuit 118 may conform to a specific communications specification (such as the Serial Advanced Technology Attachment (SATA) specification, Universal Serial Bus (USB) specification, Peripheral Component Interconnect Express (PCIe) specification, embedded Multi-Media Card (eMMC) specification, or Universal Flash Storage (UFS) specification), and may perform communications according to the specific communications specification.

In this embodiment, the host device 50 may indirectly access the NV memory 120 in the memory device 100 by transmitting a plurality of host commands and corresponding logic addresses to the memory controller 110. The memory controller 110 may receive the plurality of host commands and the logic addresses, and translate the plurality of host commands into memory operating commands (which may be referred to as "operating commands" for brevity), respectively, and then use the operating commands to control the NV memory 120 to read, write or program memory units or data pages of certain physical addresses in the NV memory 120, where the physical addresses correspond to the logical addresses. For example, the memory controller 110 may generate or update at least one logical-to-physical address mapping table, to manage relationships between the physical addresses and the logic addresses.

II. Access Control Corresponding to the Memory Architecture

According to some embodiments, in the NV memory 120, any NV memory elements 122-n within the NV memory elements 122-1, 122-2, . . . , and 122-N (e.g. the symbol "n" may represent any integer in the interval [1, N]) may comprise multiple blocks, wherein a block within the multiple blocks may comprise and record a specific number of pages. For example, the memory controller 110 may access a certain page in a certain block within the NV memory 120 according to a block address and a page address. The smallest unit that the memory controller 110 performs operations of erasing data on the NV memory 120 may be a block, and the smallest unit that the memory controller 110 performs operations of writing data on the NV memory 120 may be a page, but the present invention is not limited thereto.

According to some embodiments, the aforementioned any NV memory element 122-n may comprise multiple planes, where a plane within the multiple planes may comprise a set of blocks such as the aforementioned multiple blocks, and a block within the set of blocks may comprise and record a specific number of pages. For example, the memory controller 110 may access a certain page in a certain block in a certain plane within the NV memory 120 according to a plane number, a block address and a page address, but the present invention is not limited thereto. In these embodiments, the total block count increases, and the storage capacity of the NV memory 120 becomes larger.

Regarding manufacturing the NV memory 120, there are a plenty of applicable techniques, such as the 2D/planar NAND flash technique that arranges the memory cells into a single layer, and the 3D NAND Flash technique that arranges the memory cells into a multi-layer vertical stack. According to some embodiments, the NV memory 120 may be implemented as a planar NAND flash architecture having memory cells arranged in a single layer. According to some embodiments, the NV memory 120 may be implemented as a 3D NAND flash architecture having multi-layer vertically stacked memory cells. In this situation, the storage capacity of the NV memory 120 may become very huge.

III. Initialization Control

The memory controller 110 may control the operations of the memory device 100 according to the program code 112C in the ROM 112M, but the present invention is not limited thereto. For example, in a situation where the NV memory 120 stores an additional program code, the memory controller 110 may control the operations of the memory device 100 according to the additional program code. The program code 112C may be regarded as an original program code, for performing control on the memory device 100 when booting up. Under the control of the processor 112 that executes the program code 112C, the memory controller 110 may load the additional program code from the NV memory 120, to switch to the control corresponding to the additional program code.

Figure 2:
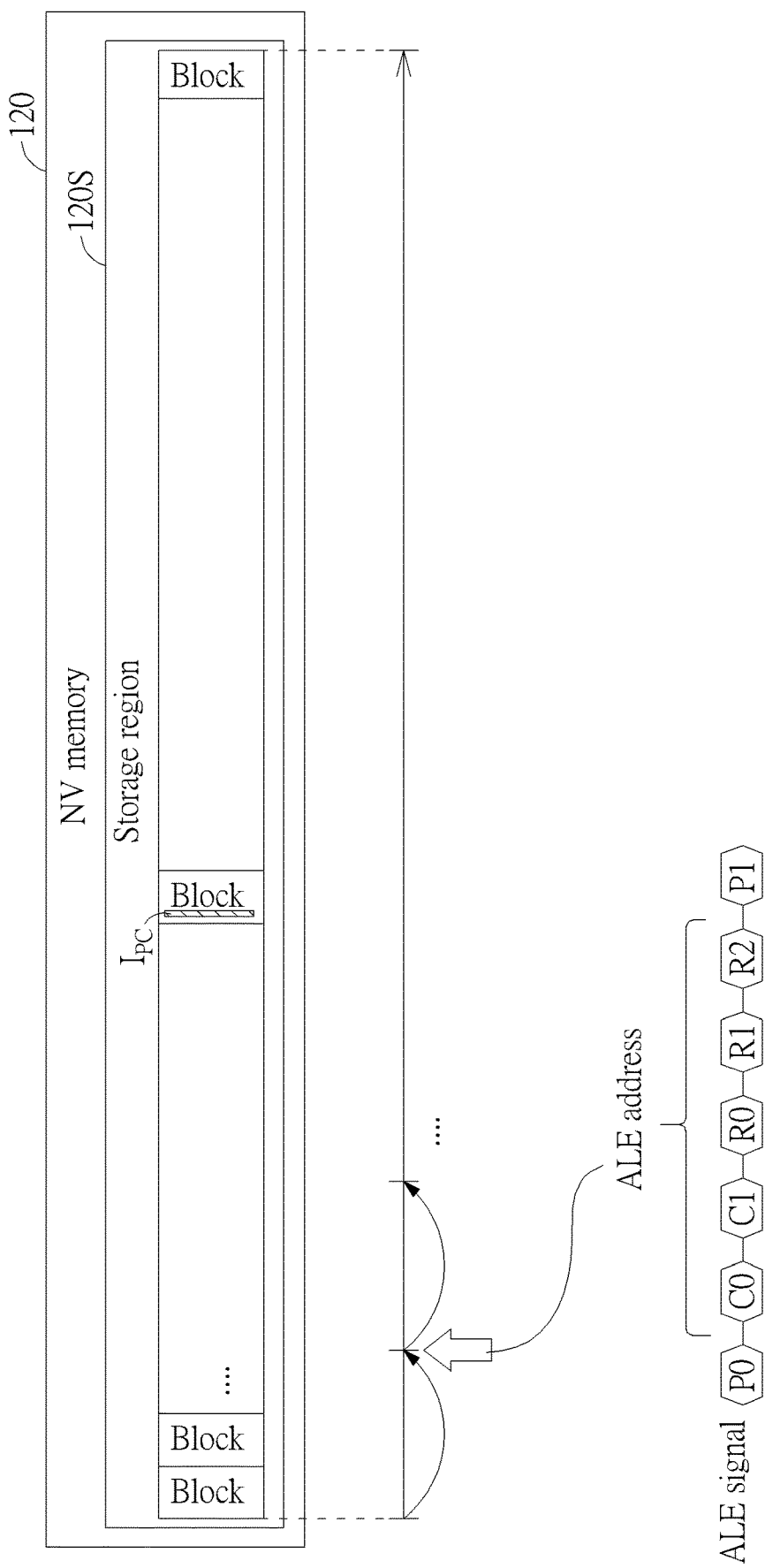
FIG. 2 illustrates a program code search control scheme of a method for performing initialization in a memory device according to an embodiment of the present invention.

FIG. 2 illustrates a program code search control scheme of a method for performing initialization in a memory device according to an embodiment of the present invention, where the method may be applied to the memory device 100 shown in FIG. 1. The aforementioned at least one NV memory element such as the one or more NV memory elements (e.g. the NV memory elements 122-1, 122-2, . . . , and 122-N) may comprise a plurality of blocks, and a storage region 120S of the NV memory 120 may comprise at least one portion of blocks within the plurality of blocks, such as at least one portion (e.g. a portion or all) of the plurality of blocks. For example, the memory controller 110 may classify the plurality of blocks into different types of blocks, respectively, and more particularly, may divide the plurality of blocks into data blocks belonging to the storage region 120S and spare blocks belonging to a spare region. The data blocks may be utilized for storing data, and the spare block may be utilized for performing internal control of the memory device 100, such as wear leveling, garbage collection, etc., where the memory controller 110 may dynamically adjust the type of any block when there is a need, but the present invention is not limited thereto. As shown in FIG. 2, the program code information $I_{PC}$ may be written into a certain block in the storage region 120S in advance to indicate one or more locations of the additional program code in storage region 120S. For example, during a production phase of the memory device 100, the memory controller 110 may write the program code information $I_{PC}$ into this block under the control of a production tool, but the present invention is not limited thereto.

The memory controller 110 may perform a program code search to find the program code information $I_{PC}$, to load the additional program code according to the program code information $I_{PC}$. Based on the address latch enable (ALE) technique, the memory controller 110 may perform the program code search via changing an ALE address in order to find the program code information $I_{PC}$, where the control information {P0, C0, C1, R0, R1, R2, P1} transmitted to the NV memory 120 by the memory controller 110 may be regarded as an ALE signal, and a portion of information therein (such as {C0, C1, R0, R1, R2}) may represent an ALE address, but the present invention is not limited thereto. According to some embodiments, the control information P0 and P1 may be 0x00 and 0x03 respectively, the control information C0 and C1 may correspond to the column control regarding memory cell access, and the control information R0, R1 and R2 may correspond to the row control regarding memory cell access, and more particularly, may correspond to the control of pages, blocks and planes respectively, but the present invention is not limited thereto. According to some embodiments, multiple sets of the program code information $\{I_{PC}\}$ may be written into multiple locations in the storage region 120S (such as different blocks thereof) in advance, to allow the memory controller 110 to easily find any of the multiple sets of program code information $\{I_{PC}\}$, but the present invention is not limited thereto.

Figure 3:
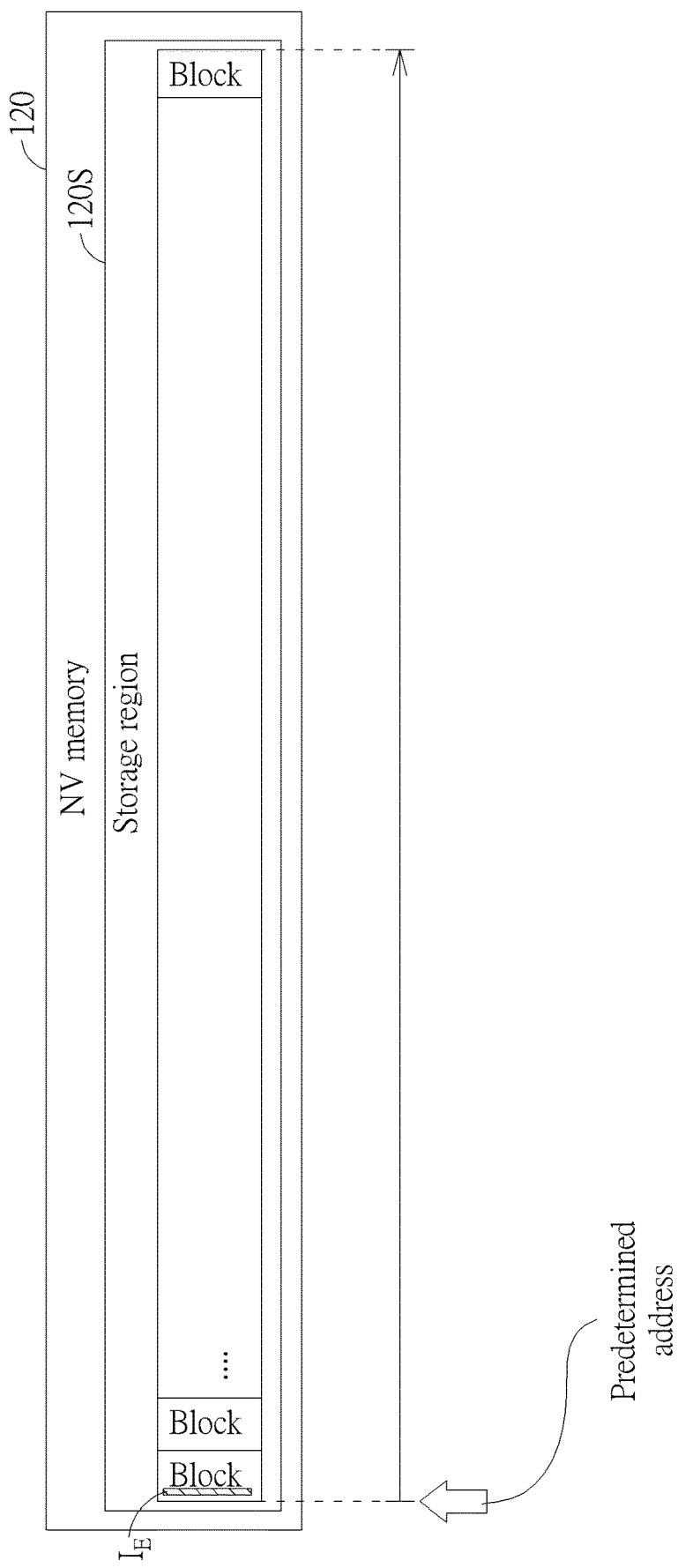
FIG. 3 illustrates an empty memory management scheme of the method according to an embodiment of the present invention.

FIG. 3 illustrates an empty memory management scheme of the method according to an embodiment of the present invention. For better comprehension, assume that the additional program code does not exist in the NV memory 120. In this situation, the memory controller 110 does not need to waste time on the program code search. According to this embodiment, an empty-memory indicator $I_E$ is applicable to determining whether the NV memory 120 is empty. For example, during the production phase of the memory device 100, the memory controller 110 may write the empty-memory indicator $I_E$ into a predetermined location in the storage region 120S (such as a first page in a first block) under the control of the production tool, where a predetermined address may represent the predetermined location, but the present invention is not limited thereto. According to some embodiments, the predetermined location may be changed, for example, may be modified to a specific block in the storage region 120S. According to some embodiments, during a production phase of the NV memory 120, the manufacturer of the NV memory 120 may utilize the production tool thereof to write the empty-memory indicator $I_E$ into the predetermined location in the storage region 120S, such as the first page in the first block.

After the NV memory 120 is powered on, the memory controller 110 may search for the empty-memory indicator $I_E$ in the storage region 120S of the NV memory 120, for example, may read the content of the predetermined location in the storage region 120S according to the predetermined address, where the empty-memory indicator $I_E$ may comprise a predetermined data pattern, such as the data pattern formed with a series of predetermined logical values (e.g. 01010101 . . . ; or 00110011 . . . ; or any other sequence of certain predetermined logical values as long as the implementation of the present invention is not hindered), for determining whether the NV memory 120 is empty or not. The existence of the predetermined data pattern may indicate that the NV memory 120 is empty, which means the additional program code does not exist therein. The memory controller 110 may read the NV memory 120 to obtain one or more sets of read data, and may check whether the predetermined data pattern exists in the one or more sets of read data to determine whether the empty-memory indicator $I_E$ is found, wherein if the predetermined data pattern exists in the one or more sets of read data, it means the empty-memory indicator $I_E$ is found; otherwise (i.e. the predetermined data pattern does not exist in the one or more sets of read data), it means the empty-memory indicator $I_E$ is not found. Further, according to whether the empty-memory indicator $I_E$ is found or not, the memory controller 110 may selectively skip or perform the program code search in the NV memory 120, to complete the initialization such as an initialization process, where the initialization such as the initialization process may comprise at least one initial setting (e.g. one or more initial settings) of the memory device 100. More particularly, when the empty-memory indicator $I_E$ is found, the program code search may be skipped; otherwise, the program code search may be performed.

Figure 4:
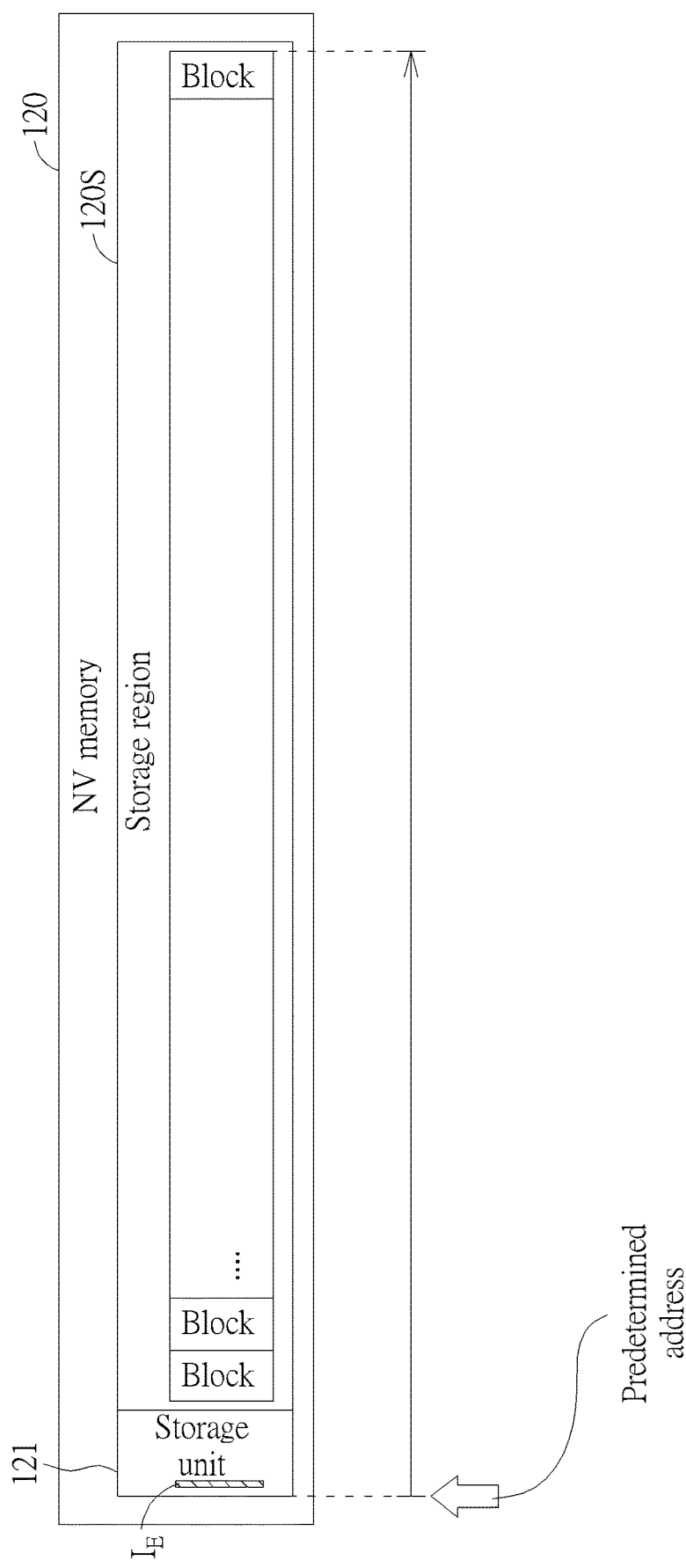
FIG. 4 illustrates an empty memory management scheme of the method according to another embodiment of the present invention.

FIG. 4 illustrates an empty memory management scheme of the method according to another embodiment of the present invention. The NV memory 120 may comprise a storage unit 121 that is arranged to store the empty-memory indicator $I_E$, where the storage unit 121 is positioned outside the one or more NV memory elements (e.g. NV memory elements 122-1, 122-2, . . . , and 122-N). Examples of the storage unit 121 may include, but are not limited to: registers. According to this embodiment, the predetermined location may be changed to the storage unit 121, and the predetermined address may be pointed toward the storage unit 121. After the NV memory 120 is powered on, the memory controller 110 may search for the empty-memory indicator $I_E$ in the storage unit 121 of the NV memory 120, for example, may read the contents in the predetermined location within the storage unit 121 according to the predetermined address.

Figure 5:
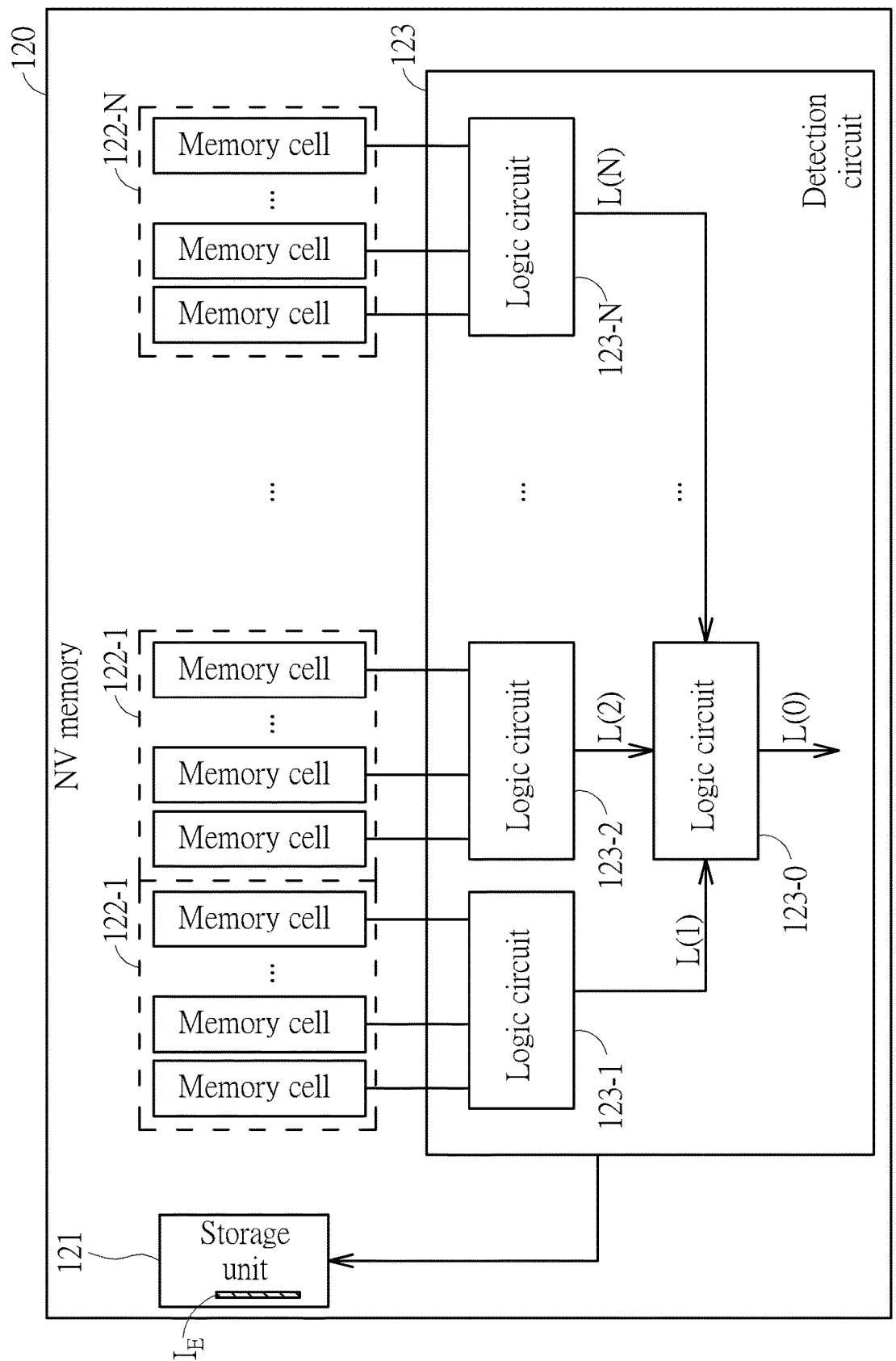
FIG. 5 illustrates related details of the empty memory management scheme shown in FIG. 4 according to an embodiment of the present invention.

FIG. 5 illustrates related details of the empty memory management scheme shown in FIG. 4 according to an embodiment of the present invention. The NV memory 120 may comprise a detection circuit 123 which is coupled to the storage unit 121 and the NV memory elements 122-1, 122-2, . . . , and 122-N. The detection circuit 123 may detect whether all the plurality of blocks are in an erase state, to selectively write the empty-memory indicator $I_E$ into the storage unit 121. If all the plurality of blocks are in the erase state, the detection circuit 123 may write the empty-memory indicator $I_E$ into the storage unit 121, otherwise, the detection circuit 123 prevents writing the empty-memory indicator $I_E$ into the storage unit 121. According to this embodiment, the detection circuit 123 may comprise one or more sets of logic circuits, for generating at least one logic signal according to whether all the plurality of blocks are in an erase state, where the detection circuit 123 may determine whether all the plurality of blocks are in the erase state according to the aforementioned at least one logic signal. For example, the one or more sets of logic circuits may comprise the logic circuits {123-0, 123-1, 123-2, . . . , 123-N} that are coupled to all memory cells in the NV memory elements 122-1, 122-2, . . . , and 122-N, and the aforementioned at least one logic signal may comprise the logic signals {L(0), L(1), L(2), . . . , L(N)} respectively generated by the logic circuits {123-0, 123-1, 123-2, . . . , 123-N}, but the present invention is not limited thereto.

According to some embodiments, the storage in the memory device 100 may store a first program code (e.g. the original program code, such as the program code 112C), for controlling the memory device 100 during booting up. For example, in a situation where the empty-memory indicator $I_E$ is found, after the program code search is skipped, the memory controller 110 may perform initial settings corresponding to the first program code, to complete the initialization such as the initialization process. In another example, in a situation where the empty-memory indicator $I_E$ is not found, after the program code search is performed, the memory controller 110 may check whether the program code information $I_{PC}$ is found in the NV memory 120. When the program code information $I_{PC}$ is found, the memory controller 110 may load a second program code (e.g. the additional program code) from the NV memory 120 according to the program code information $I_{PC}$ to control the memory device 100, and may perform initial settings corresponding to the second program code, to complete the initialization such as the initialization process. When the program code information $I_{PC}$ is not found, the memory controller 110 may perform the initial settings corresponding to the first program code, to complete the initialization such as the initialization process. For brevity, similar descriptions for this embodiment are not repeated in detail here.

Figure 6:
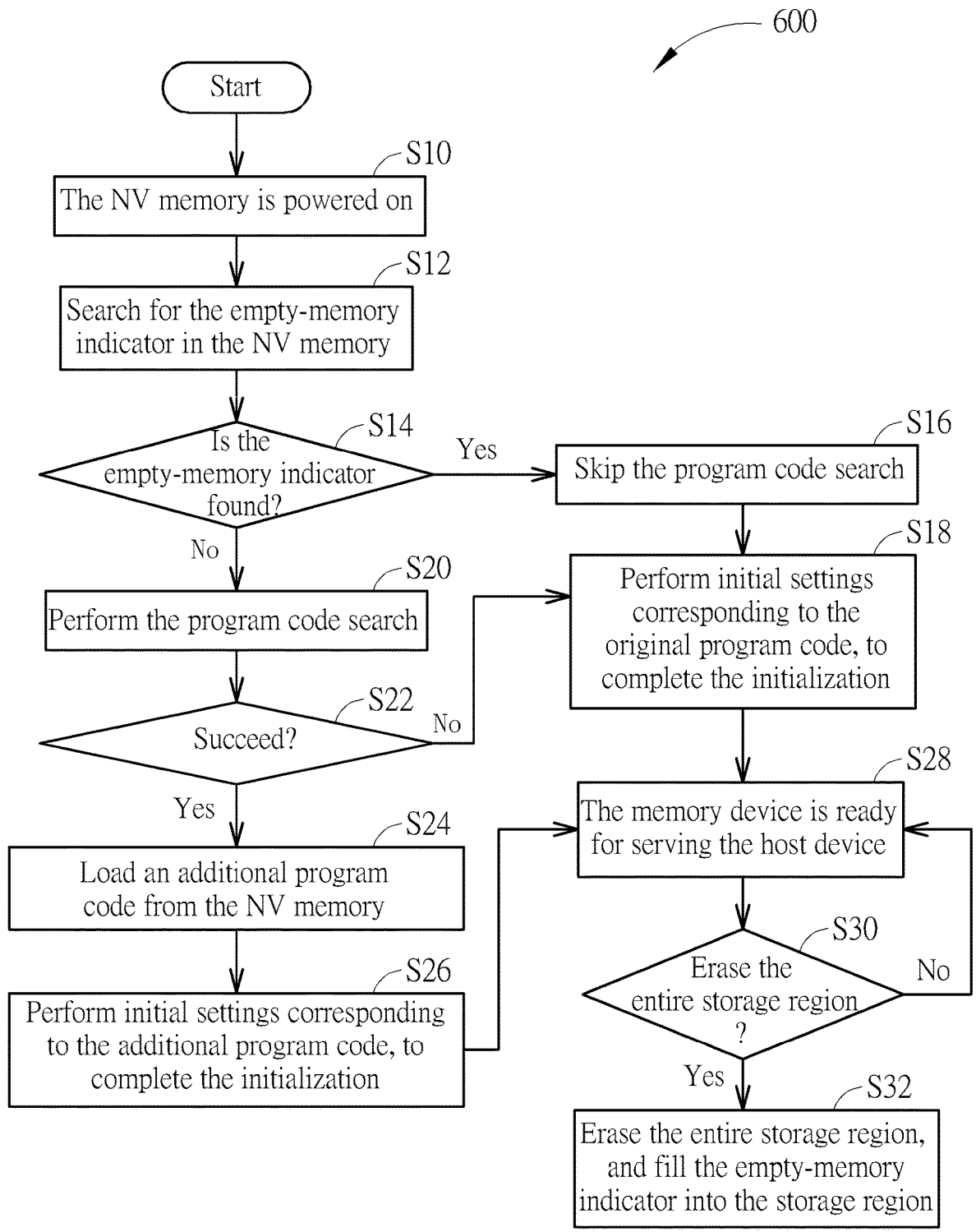
FIG. 6 illustrates a working flow of the method according to an embodiment of the present invention.

FIG. 6 illustrates a working flow 600 of the method according to an embodiment of the present invention.

In Step S10, the NV memory 120 is powered on.

In Step S12, the memory controller 110 may search for the empty-memory indicator $I_E$ in the NV memory 120.

In Step S14, the memory controller 110 may check whether the empty-memory indicator $I_E$ is found or not. When the empty-memory indicator $I_E$ is found, Step S16 is entered; otherwise, Step S20 is entered.

In Step S16, the memory controller 110 may skip the program code search.

In Step S18, the memory controller 110 may perform initial settings corresponding to the original program code (such as program code 112C), to complete the initialization (e.g. the initialization process).

In Step S20, the memory controller 110 may perform the program code search.

In Step S22, the memory controller 110 may check whether the search is successful or not. When the program code information $I_{PC}$ is found, the memory controller 110 may determine that the search is successful, and Step S24 is entered; otherwise (i.e. the program code information $I_{PC}$ is not found), the memory controller 110 may determine that the search is not successful, and Step S18 is entered.

In Step S24, the memory controller 110 may load the additional program code from the NV memory 120.

In Step S26, the memory controller 110 may perform initial settings corresponding to the additional program code, to complete the initialization (e.g. the initialization process).

In Step S28, after the initialization (e.g. the initialization process) of the memory device 100 is completed, the memory device 100 is ready for serving the host device 50, for being accessed by the host device 50.

In Step S30, the memory controller 110 may determine whether to erase the entire storage region, such as the whole of the storage region 120S. For example, when the host device 50 transmits a predetermined command (such as an erase command) to the memory device 100 to demand the memory device 100 to erase the entire storage region, Step S32 is entered; otherwise, Step S28 is entered.

In Step S32, the memory controller 110 may erase the entire storage region, such as the whole of the storage region 120S of the NV memory 120, and may fill the empty-memory indicator $I_E$ into the storage region 120S. For brevity, similar descriptions for this embodiment are not repeated in detail here.

According to some embodiments, one or more steps may be added, changed, or deleted in the working flow 600. According to some embodiments, the order of a portion of steps in the working flow 600 may be modified.

According to some embodiments, the memory device 100 may be applied to high-end products. For example, flash memory manufacturers may adopt newer techniques to manufacture flash memories equipped with ultra-large storage space, and the NV memory 120 may be one of these flash memories equipped with ultra-large storage space. In this situation, if the design of the present invention related to the empty-memory indicator $I_E$ were not utilized, in response to the NV memory 120 being empty, the program code search would be very time-consuming. What is even worse, the long program code search period could make the initialization longer, e.g. a few seconds. This might cause suffering of the trade-off between the searching speed and the searching reliability/validity. Based on the method of the present invention, when the empty-memory indicator $I_E$ is found, it is not necessary for the memory controller 110 to waste time on the program code search. Hence, the method and the associated apparatus of the present invention can reach the optimal performance of the memory device 100 without introducing a side effect or in a way that is less likely to introduce a side effect.

According to some embodiments, the memory device 100 may be applied to low-end products in order to save the cost and/or prevent wasting the resource. For example, when the flash memory manufacturers adopt newer techniques to manufacture flash memories equipped with ultra-large storage space, they may release some downgraded flash memories in much cheaper prices and do not guarantee that theses downgraded flash memories are usable. In these embodiments, the one or more NV memory elements (e.g. the NV memory elements 122-1, 122-2, ..., and 122-N) in the NV memory 120 may be downgraded flash dies, and there may be many bad blocks (i.e. unusable blocks) in the plurality of blocks, for example, the ratio of the number of usable blocks to the total block count of the plurality of blocks may be 90%, 50%, 30%, 10%, or even lower. In this situation, if the design of the present invention related to the empty-memory indicator $I_E$ were not utilized, in response to the NV memory 120 being empty, the program code search would be very time-consuming. What is even worse, the long program code search period could make the initialization longer, e.g. ten seconds or above, where it might be needed to increase the density of searching points so as to improve the searching reliability/validity, causing the searching speed becoming lower correspondingly. Based on the method, when the empty-memory indicator $I_E$ is found, it is not necessary for the memory controller 110 to waste time on the program code search. Hence, the method and the associated apparatus of the present invention can reach the optimal performance of the memory device 100 without introducing a side effect or in a way that is less likely to introduce a side effect. In addition, the goals of saving the cost and preventing wasting the resource can be achieved by employing the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing initialization in a memory device, the memory device comprising a memory controller and a non-volatile (NV) memory, the NV memory comprising one or more NV memory elements, the one or more NV memory elements comprising a plurality of blocks, and the method comprising:

after the NV memory is powered on, searching for an empty-memory indicator in the NV memory by using the memory controller, to generate a checking result, wherein the empty-memory indicator is applicable to determining, by using the memory controller, whether the NV memory is empty, and the checking result generated by the memory controller indicates whether the empty-memory indicator is found or not, for indicating whether the NV memory is empty or not; and according to the checking result indicating whether the empty-memory indicator is found or not, selectively skipping or performing a program code search in the NV memory, and further performing at least one initial setting of the memory device to complete an initialization process, wherein the initialization process comprises said at least one initial setting of the memory device, said at least one initial setting corresponds to at least one program code obtained by the memory controller in response to selectively skipping or performing the program code search, and if the empty-memory indicator is found, the program code search is skipped, otherwise, the program code search is performed.

2. The method of claim 1, wherein the empty-memory indicator comprises a predetermined data pattern; and the step of searching for the empty-memory indicator in the NV memory further comprises:

reading the NV memory to obtain one or more sets of read data; and checking whether the predetermined data pattern exists in the one or more sets of read data to determine whether the empty-memory indicator is found, wherein the predetermined data pattern existing in the one or more sets of read data indicates that the empty-memory indicator is found, and the predetermined data pattern not existing in the one or more sets of read data indicates that the empty-memory indicator is not found.

3. The method of claim 1, wherein the step of searching for the empty-memory indicator in the NV memory further comprises:
   after the NV memory is powered on, searching for the empty-memory indicator in a storage region in the NV memory, wherein the storage region comprises at least one portion of blocks within the plurality of blocks.

4. The method of claim 1, wherein the step of searching for the empty-memory indicator in the NV memory further comprises:
   after the NV memory is powered on, searching for the empty-memory indicator in a storage unit in the NV memory, wherein the storage unit is positioned outside the one or more NV memory elements.

5. The method of claim 4, wherein the NV memory comprises:
   a detection circuit, coupled to the storage unit and the one or more NV memory elements, and arranged to detect whether all the plurality of blocks are in an erase state, to selectively write the empty-memory indicator into the storage unit, wherein if all the plurality of blocks are in the erase state, the detection circuit writes the empty-memory indicator into the storage unit, otherwise, the detection circuit prevents writing the empty-memory indicator into the storage unit.

6. The method of claim 5, wherein the detection circuit comprises:
   one or more sets of logic circuits, coupled to all memory cells within the one or more NV memory elements, arranged to generate at least one logic signal according to whether all the plurality of blocks are in the erase state, wherein the detection circuit determines whether all the plurality of blocks are in the erase state according to said at least one logic signal.

7. The method of claim 1, wherein the memory device comprises a storage, and the storage is positioned outside the NV memory, wherein the storage stores a first program code for controlling the memory device during booting up; and the method further comprises:
   after the program code search is skipped, performing initial settings corresponding to the first program code, to complete the initialization process.

8. The method of claim 1, wherein the memory device comprises a storage, and the storage is positioned outside the NV memory, wherein the storage stores a first program code for controlling the memory device during booting up; and the method further comprises:
   after the program code search is performed, checking whether program code information is found in the NV memory;
   in response to the program code information being found, loading a second program code from the NV memory according to the program code information to control the memory device; and
   performing initial settings corresponding to the second program code, to complete the initialization process.

9. The method of claim 1, wherein the memory device comprises a storage, and the storage is positioned outside the NV memory, wherein the storage stores a first program code for controlling the memory device during booting up; and the method further comprises:
   after the program code search is performed, checking whether program code information is found in the NV memory; and
   in response to the program code information being not found in the NV memory, performing initial settings corresponding to the first program code, to complete the initialization process.

10. The method of claim 1, wherein after the initialization process of the memory device is completed, and the memory device is ready for serving a host device, for being accessed by the host device.

11. The method of claim 1, further comprising:
   erasing a storage region of the NV memory, and filling the empty-memory indicator into the storage region, wherein the storage region comprises at least one portion of blocks within the plurality of blocks.

12. A memory device, comprising:
   a non-volatile (NV) memory, arranged to store information, wherein the NV memory comprises one or more NV memory elements, and the one or more NV memory elements comprise a plurality of blocks; and
   a controller, coupled to the NV memory, arranged to control operations of the memory device, wherein the controller comprises:
      a processing circuit, arranged to control the controller according to a plurality of host commands from a host device, to allow the host device to access the NV memory via the controller, wherein:
         after the NV memory is powered on, the controller searches for an empty-memory indicator in the NV memory, to generate a checking result, wherein the empty-memory indicator is applicable to determining, by using the controller, whether the NV memory is empty, and the checking result generated by the controller indicates whether the empty-memory indicator is found or not, for indicating whether the NV memory is empty or not; and
         according to the checking result indicating whether the empty-memory indicator is found or not, the controller selectively skips or performs a program code search in the NV memory, and further performs at least one initial setting of the memory device to complete an initialization process, wherein the initialization process comprises said at least one initial setting of the memory device, said at least one initial setting corresponds to at least one program code obtained by the controller in response to selectively skipping or performing the program code search, and if the empty-memory indicator is found, the program code search is skipped, otherwise, the program code search is performed.

13. The memory device of claim 12, wherein after the NV memory is powered on, the controller searches for the empty-memory indicator in a storage region of the NV memory, wherein the storage region comprises at least one portion of blocks within the plurality of blocks.

14. The memory device of claim 12, wherein after the NV memory is powered on, the controller searches for the empty-memory indicator in a storage unit of the NV memory, wherein the storage unit is positioned outside the one or more NV memory elements.

15. The memory device of claim 12, wherein after the initialization process of the memory device is completed, the memory device is ready for serving the host device, for being accessed by the host device.

16. An electronic device that comprises the memory device of claim 12, and further comprises:
  the host device, coupled to the memory device, wherein the host device comprises:
    at least one processor, arranged to control operations of the host device; and
    a power supply circuit, coupled to said at least one processor, arranged to provide power to said at least one processor and the memory device;
  wherein the memory device is arranged to provide storage space for the host device.

17. A controller of a memory device, the memory device comprising the controller and a non-volatile (NV) memory, the NV memory comprising one or more NV memory elements, the one or more NV memory elements comprising a plurality of blocks, the controller comprising:
  a processing circuit, arranged to control the controller according to a plurality of host commands from a host device, to allow the host device to access the NV memory via the controller, wherein:
    after the NV memory is powered on, the controller searches for an empty-memory indicator in the NV memory, to generate a checking result, wherein the empty-memory indicator is applicable to determining, by using the controller, whether the NV memory is empty, and the checking result generated by the controller indicates whether the empty-memory indicator is found or not, for indicating whether the NV memory is empty or not; and
    according to the checking result indicating whether the empty-memory indicator is found or not, the controller selectively skips or performs a program code search in the NV memory, and further performs at least one initial setting of the memory device to complete an initialization process, wherein the initialization process comprises said at least one initial setting of the memory device, said at least one initial setting corresponds to at least one program code obtained by the controller in response to selectively skipping or performing the program code search, and if the empty-memory indicator is found, the program code search is skipped, otherwise, the program code search is performed.

18. The controller of claim 17, wherein after the NV memory is powered on, the controller searches for the empty-memory indicator in a storage region of the NV memory, wherein the storage region comprises at least one portion of blocks within the plurality of blocks.

19. The controller of claim 17, wherein after the NV memory is powered on, the controller searches for the empty-memory indicator in a storage unit of the NV memory, wherein the storage unit is positioned outside the one or more NV memory elements.

20. The controller of claim 17, wherein after the initialization process of the memory device is completed, and the memory device is ready for serving the host device, for being accessed by the host device.

* * * * *